United States Patent [19]
Yatsugi et al.

[11] Patent Number: 5,854,874
[45] Date of Patent: Dec. 29, 1998

[54] IMAGE RECORDING/REPRODUCING SYSTEM

[75] Inventors: Tomishige Yatsugi; Masayuki Kimura, both of Hitachinaka, Japan

[73] Assignee: Hitachi, Ltd., Tokyo, Japan

[21] Appl. No.: 717,235

[22] Filed: Sep. 20, 1996

[30] Foreign Application Priority Data

Sep. 26, 1995 [JP] Japan ................................. 7-247916

[51] Int. Cl.⁶ ................................................. H04N 5/225
[52] U.S. Cl. ........................................... 386/118; 386/117
[58] Field of Search ............................. 386/46, 109, 111, 386/112, 117, 118, 107, 78; 348/222, 241, 244; H04N 5/225

[56] References Cited

U.S. PATENT DOCUMENTS

| | | | |
|---|---|---|---|
| 4,547,809 | 10/1985 | Southgate | 386/118 |
| 5,027,214 | 6/1991 | Fujimori | 386/118 |

*Primary Examiner*—Robert Chevalier
*Attorney, Agent, or Firm*—Antonelli, Terry, Stout & Kraus, LLP

[57] ABSTRACT

In a combined, small-sized, portable video/still camera system, it is intended to improve the reliability against a rise in internal temperature of the system and improved reliability against vibration, while keeping small the external size of the system. Such compact system includes a PCMCIA hard disk drive capable of being loaded to, and removed from, the image recording/reproducing system. According to the present invention, as set forth hereinabove, a plate or medium formed of a thermally conductive rubber or copper (higher in thermal conductivity than air) is mounted on an encoder LSI package attached to a side of a circuit board opposite to the hard disk mounted side, and such medium is arranged to conduct heat to the system housing formed of aluminum or other material high in thermal conductivity. As a result, the housing is efficiently used as a heat sink. The hard disk is disposed centrally in the interior of the system, and thus an impact or vibration exerted on the exterior of the system is transmitted to the hard disk only through the mounting frame, so that the impact or vibration is relatively diminished. As an additional advantageous arrangement, the LSI package surface and the system housing are drawn very close to each other, for example not larger than 2 mm in terms of the spacing between the two, such that the heat of the LSI package can be transferred to the system housing at a high efficiency.

25 Claims, 5 Drawing Sheets

IMAGE RECORDING/REPRODUCING SYSTEM

FIELD OF THE INVENTION

The present invention relates to a video camera or still camera or combined video/still camera for recording a digital signal. Particularly, the invention is concerned with how to reduce a size of a camera system which adopts a PC card type magnetic recording medium.

DESCRIPTION OF RELATED ART

According to the related art, as illustrated in FIG. 3 of Japanese Patent Laid-Open No. Hei 4-328966 (1992), it is known to insert an information recording medium in parallel with a wide area portion of an image recording/reproducing system. In such art, however, no special consideration is given to an arrangement of the information recording medium, image signal compressing circuit and lens unit suitable for reducing a size of the system.

More particularly, for a portable video camera or still camera, the reduction of its size is very important. In general, however, a digital signal compressing circuit or an LSI thereof involves a heat generation of several watts or so. According to the related art, therefore, when such circuit is mounted within an image recording/reproducing system, there arises a problem that the smaller the size of the camera, the internal temperature of the system becomes higher.

In addition to temperature consideration, a magnetic recording arrangement using a hard disk is apt to be affected by any impact or vibration in comparison with a magnetic recording arrangement using an ordinary magnetic tape.

SUMMARY OF THE INVENTION

Objects of the present invention are to minimize a rise in internal temperature of an image recording/reproducing system, protect a hard disk against an impact exerted on an exterior of the system, and protect the hard disk from heat generated by a signal processing circuit while reducing a size of the recording/reproducing system.

The above objects are achieved by disposing a magnetic recording arrangement comprising a hard disk and a digital signal compressing circuit on opposite surfaces, i.e., a front and back, of a single circuit board, disposing the hard disk centrally in an interior of the image recording/reproducing system, disposing the signal compressing circuit in the vicinity of (i.e., in close proximity to) the system housing, and interposing a heat radiating plate or material between the package surface of an LSI (Large Scale Integrated) package of the signal compressing circuit and the system housing.

More particularly, discussing the above arrangements in greater detail, in the present invention, a magnetic recording arrangement comprising a hard disk and a digital signal compressing circuit are disposed on opposite front and back surfaces of a single circuit board, whereby a digital signal recording circuit can be constructed having a small volume, and the circuit board can act as a thermal barrier to reduce or block a heat conduction path from the digital signal compressing circuit (and especially an LSI circuit thereof) to the hard disk.

Further, the hard disk is disposed centrally in the interior of the image recording/reproducing system, and accordingly, any impact or vibration imposed on the exterior of the system is transmitted to the hard disk only indirectly through a circuit board mounting frame or through the circuit board, whereby the impact or vibration is diminished to protect the hard disk. Disposing the hard disk centrally also reduces a hard disk noise reaching an outside of the camera housing.

Still further the signal compressing circuit (and especially an LSI package thereof) is disposed in the vicinity of (i.e., in close proximity to) the system housing, a heat radiating plate or material is interposed between the LSI package surface of the signal compressing circuit and the system housing. The housing is formed of aluminum or the like, whereby there can be attained a very efficient heat conduction and dissipation arrangement which utilizes the system housing as a heat sink, and hence it is possible to decrease a rise in internal temperature of the system.

The foregoing and other objects, advantages, manner of operation, novel features and a better understanding of the present invention will become apparent from the following detailed description of the preferred embodiments and claims when read in connection with the accompanying drawings, all forming a part of the disclosure hereof this invention. While the foregoing and following written and illustrated disclosure focuses on disclosing embodiments of the invention which are considered preferred embodiments, it should be clearly understood that the same is by way of illustration and example only and is not to be taken by way of limitation, the spirit and scope of the present invention being limited only by the terms of the appended claims.

DETAILED DESCRIPTION OF THE PREFERRED EMBODIMENTS OF THE INVENTION

Referring now to the drawings, wherein like reference numerals are utilized to designate like parts of the present invention, the present invention will be described below with reference to FIGS. 1 to 6. More particularly, FIG. 1 is a structural diagram of a combined portable camera-video (i.e., still camera and video camera) system, showing a central section of the system.

Figure 1:
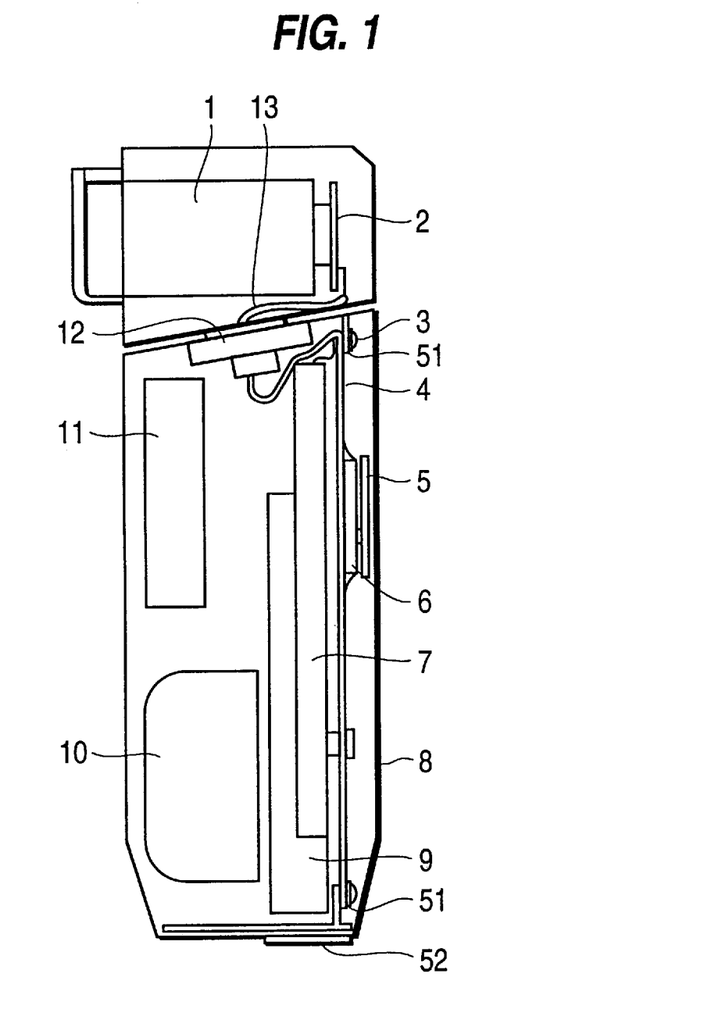
FIG. 1 is a structural sectional view of a combined portable camera-video system.

In FIG. 1, the numeral 1 denotes a lens unit (e.g., an automatic or manual focusing 3× lens unit), numeral 4 denotes a circuit board with a signal processing circuit mounted thereon, numeral 6 denotes an LSI package for compressing a video signal, numeral 7 denotes a PCMCIA card connector mounted to the circuit board, numeral 9 denotes a card type hard disk drive of a PCMCIA Type 3, numeral 10 denotes a battery, and numeral 11 denotes a liquid crystal display panel, numeral 51 denotes a rubber vibration isolator, and numeral 52 denotes a card slot for the card type hard disk drive.

The PCMCIA as referred to herein stands for Personal Computer Memory Card International Association, which is a unified standard name of card type information recording systems used in the field of personal computers. According to such PCMCIA standard, an external size of PCMCIA devices is standardized at 54.4 mm long by 85.6 mm wide, and the thickness is 3.3 mm in a Type 1 device (which is the thinnest), 5.0 mm in Type 2, and 10.5 mm in Type 3. Generally in a Type 1 device, a semiconductor memory (e.g., packages or flash memory) is incorporated in the interior of a card to store data processed by a personal computer. As the type number becomes larger, e.g., becomes a Type 2 or Type 3, a number and size of parts capable of being incorporated in a card become greater. In a Type 3 card, it is possible to incorporate both a hard disk of 1.8 inch size and a drive unit therefor. This hard disk capacity permits a large amount of non-volatile storage, e.g., 200 to 340 M bytes. For example, in the case of video-audio data of the MPEG1 (Moving Picture Experts Group, ISO 11172 Video-Audio Compressing Standard) format, such storage can record a video data volume corresponding to 30 minutes or so. Accordingly, in addition to use of PCMCIA hard disk devices in computers, such recording arrangement is also applicable as a recording medium in a home video camera.

Moreover, as noted above, since the external shape of the PCMCIA card is much smaller than that of a typical VTR using an 8 mm tape and requiring an associated tape drive mechanism, it is possible to reduce the size of the system body. In the case where the present invention is applied to a system using such PCMCIA card type hard disk as a recording medium in a combined video/still camera system, it is possible to attain a reduction of size and cost and improvement of reliability of the system to a greatest extent.

Returning now to the figure drawing, FIG. 1 is a sectional view of a combined video/still camera system having a reduced size of an external shape, which is 140 mm high, 76 mm wide, and 43 mm thick, exclusive of the lens portion. The system operates in the following manner. First, light is condensed by the lens unit 1, such light is focused onto a CCD sensor 2 and is converted thereby into an analog electric signal. The lens unit 1 and the CCD portion are connected to the body through a rotating mechanism 12 so as to be rotatable for a predetermined range, e.g., 180°, at the center of the rotating mechanism 12.

When the rotating mechanism 12 is in the state shown in FIG. 1, the lens unit 1 is directed at the same angle as the liquid crystal panel 11, so that it is possible to take a picture of the photographer. On the other hand, when the rotating mechanism 12 is rotated 180°, the lens unit is directed toward an object, thus permitting an ordinary way of use, i.e., with the lens unit directed toward an object and a user viewing the liquid crystal panel. Next, the analog output signal from the CCD sensor 2 is transmitted to the circuit board 4 within the camera body through a flexible connector 13 which is inserted through a hole formed centrally within the rotating mechanism 12.

The signal which has been inputted to the circuit board 4 is first converted to digital data by means of a 10-bit ADC (Analog-to-Digital Converter). Such data train, in this embodiment, is transmitted at 10 bits×14.3 MHz. Thus, the speed is very high and a data volume is very large. It is impossible to store unprocessed data as they are in the recording medium (e.g., due to a large volume thereof). In this embodiment, therefore, the image data is compressed to about one fiftieth by means of the LSI package 6 providing an image compressing encoder which is in conformity with MPEG1. Further, an MPEG1-defined header and voice data can be added to the image compressed data, which is then sent to a PCMCIA interface LSI, and is finally recorded in a PCMCIA card type hard disk. On the other hand, the signal from the camera obtained simultaneously with the recording signal is monitored by the liquid crystal panel 11, which panel preferably operates as a view finder of the camera.

The image compressing encoder LSI package 6 is required to operate at a very high speed. As defined by the MPEG1 format, and in order to perform desired processings in real time, i.e., of detecting a motion vector in the signal before compression, suppression of high-frequency component data by DCT (discrete cosine transformation), Huffman coding, and transmission rate control, it is necessary to provide an operation clock as large as 50 to 100 MHz. With regard to such high operation clock frequency, in the case of an LSI package fabricated using a CMOS process, the power consumption increases in proportion to the working frequency. For this reason, the above encoder LSI package 6 consumes power as high as 400 to 500 mW although the supply voltage is set as low as 3 V.

Figure 7:
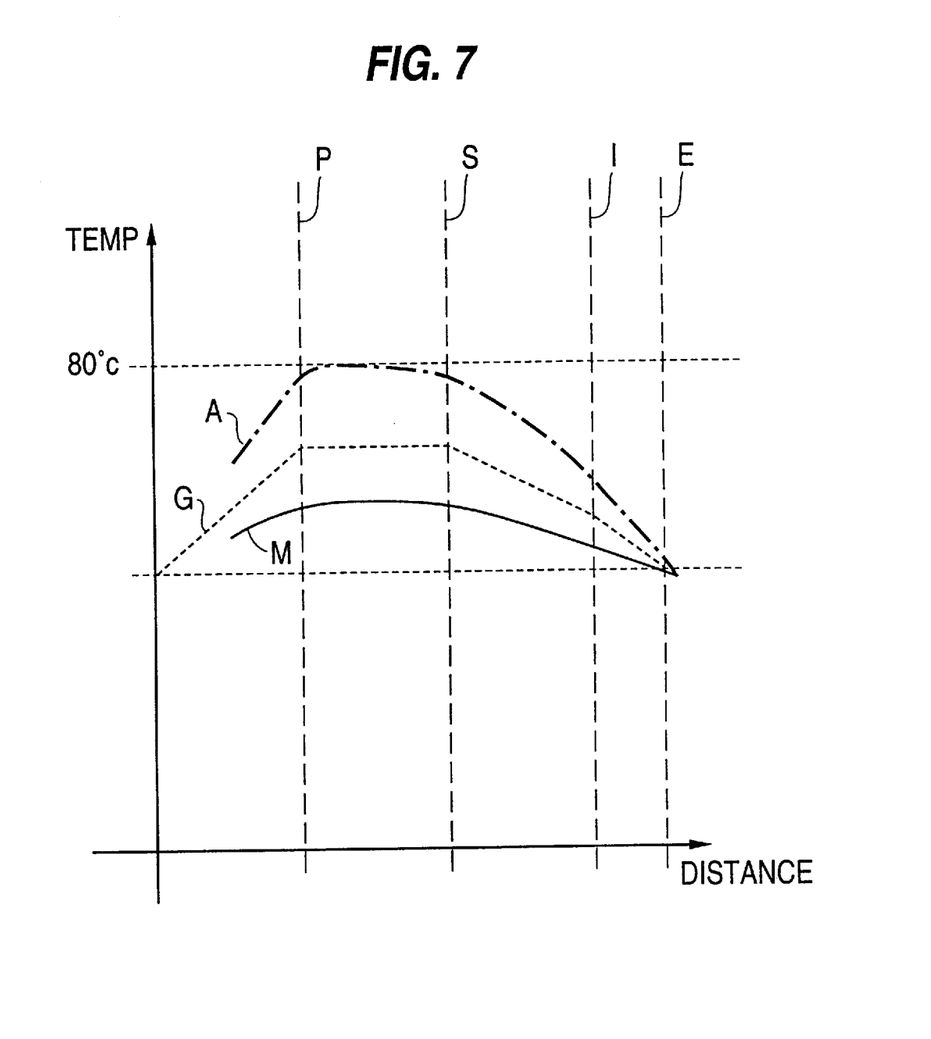
FIG. 7 is a temperature verses distance chart comparing temperatures of a disadvantageous spaced embodiment using only air for heat conduction and the present invention using a medium for heat conduction.

On the other hand, the amount of air in an interior of the portable system in question is very small because the reduction of its size is made to a thorough extent. Therefore, if the LSI package not in close proximity to a system housing is used while relying only on the ambient air for radiation of heat, the internal temperature of the system will easily exceed an operating temperature of the LSI package when an operation guarantee temperature of the system is set at 40° C. More particularly, attention is directed to FIG. 7 representing an illustration of temperature verses distance as encountered within a relevant portion of the camera system. More specifically, curve A represents a plot of internal system temperatures encountered at a printed circuit board surface P, an LSI substrate S, an interior surface I of the housing and an exterior surface E of the housing. As can be seen by curve A, an arrangement excessively distanced from a housing and using only ambient air for radiation of heat from the LSI package to the housing can easily have temperatures which exceed an operation guarantee temperature G of the system. In addition, any components located in the interior of the system and being thermally sensitive, e.g. hard disk, are badly influenced, thus resulting in that a reliability of the system is markedly impaired.

If a heat radiating plate (e.g., finned heat sink) usually employed with conventional ICs and LSIs is attached to the above encoder LSI package 6, there arises a problem that an external size the system must be made larger and that a reduction in size and weight of the system intended originally is not attained.

The above problems can be solved by the present invention wherein the encoder LSI package 6 is mounted on the side of the circuit board 4 opposite to the hard disk mounted side, and a thermal conduction plate or medium 5 having a thermal conductivity higher than that of air (such as a thermally conductive rubber plate, copper plate or jell pack) is attached onto the encoder LSI package 6 to conduct heat to the system housing 8 formed of aluminum which itself is high in thermal conductivity. The system housing 8 is not limited to being composed of aluminum, but may be constructed of any other thermally conductive material such as copper, magnesium, silver, gold, etc. Further, the system housing 8 need not be constructed entirely of the heat conductive material, but instead may be only partially constructed of heat conductive material, i.e., as long as sufficient heat conductive material is used to allow such portion of the housing to act as a heat sink to conduct away and dissipate sufficient heat from the LSI package. As can be seen by the curve M in FIG. 7, such arrangement including the plate or medium allows internal operating temperatures at the printed circuit board P, the LSI substrate S and an interior surface I of the housing to be lower than the operation guarantee temperature G of the system.

The arrangement of having the LSI package 6 mounted on a printed circuit board 4 side opposite to a side on which the PCMCIA hard disk drive 9 is mounted is advantageous, in that the printed circuit board 4 can act as a thermal barrier to reduce or block a heat conduction path from the LSI package 6 to the PCMCIA hard disk drive 9. Discrete electronic components mounted on the printed circuit board 4 in a space between the printed circuit board 4 and the PCMCIA connector 7 can likewise take advantage of the thermal barrier effect of the printed circuit board, i.e., to be protected from the heat of the LSI package 6.

Thermal barrier protection can be afforded to the PCMCIA hard disk drive 9 in two additional ways. More particularly, first the PCMCIA connector 7 can be mounted onto the printed circuit board 4 using thermally isolating plastic, non-conductive rubber, or other type of mounts providing a poor thermal conduction path between the printed circuit board 4 and PCMCIA connector 7. Second, the printed circuit board 4 can be sealingly mounted with respect to the housing so as to create two segregated air chambers within the housing 8, i.e., a first chamber defined between the printed circuit board 4 and housing 8 and containing the LSI package 6 therein, and a second chamber defined between the printed circuit board 4 and housing 8 and containing the PCMCIA hard disk drive 9 therein. Segregation of air within the separate chambers reduces heat conduction from the LSI package 6 to the PCMCIA hard disk drive 9 via air conduction.

In addition to the above advantageous arrangement, since the connector 7 and hard disk body 9 conforming to the foregoing PCMCIA Type 3 are mounted in such postures as shown in FIG. 1, there also is attained a merit that the rotating mechanism 12 can be effectively mounted as shown in FIG. 1. Moreover, since the hard disk can be disposed centrally in the interior of the system, an impact or vibration, even when applied to an exterior of the system, is transmitted to the hard disk only through a mounting frame 3, so that the impact or vibration is relatively diminished. The mounting frame 3 can include, for example, rubber, spring and/or foam arrangements provided between the housing 8 and circuit board 4 to isolate, absorb or dissipate transmission of a vibration or impact from the housing 8 to the circuit board, and likewise, rubber, spring and/or foam arrangements an be provided between the circuit board 4 and the PCMCIA card connector 7. Such central location and impact/vibration isolation contribute to an operational stability of the hard disk. Further, the central location of the PCMCIA hard disk drive 9 is further advantageous in that there is a reduction in hard drive noise which is transmitted to an outside of the housing 8 and heard by a user.

Although in FIG. 1, a plate 5 formed of a thermally conductive rubber or copper having a higher thermal conductivity than air is mounted on the LSI 6, there may be adopted a method which permits omission of such plate. More specifically, by drawing the LSI surface and the system housing very close to each other, for example not larger than 2 mm in terms of spacing between the two, the air which has been heated by the LSI surface is mostly transmitted along the inner surface of the system housing, whereby the heat of the LSI can be transferred efficiently to the system housing. Thus, the closer the circuit board and especially the LSI package to the system housing, the higher the conduction and dissipation of heat using the system housing 8 and the smaller the rise in internal temperature of the system. By providing a heat emitting surface within a predetermined close distance (e.g., 2 mm) from an internal surface of the housing, a predetermined amount of heat transfer to the housing can be guaranteed. Consequently, a combined portable video/still camera system or the like can be realized having a high efficiency without contradiction to reduction in size of the system.

Figure 2:
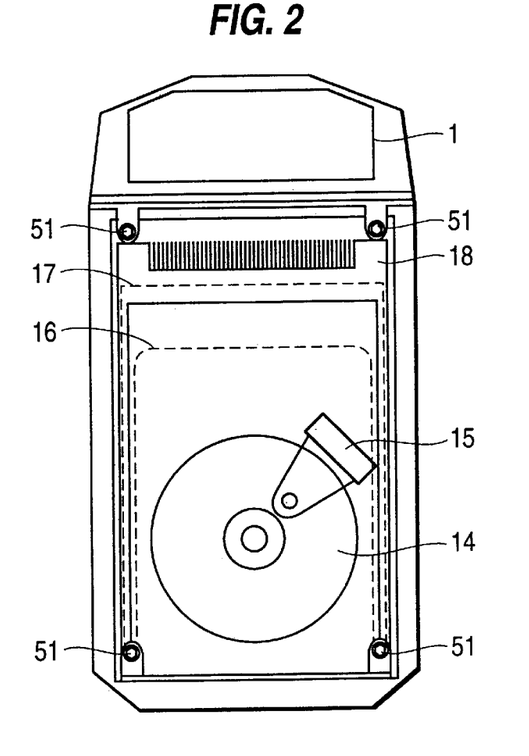
FIG. 2 is a structural diagram obtained by seeing the structure of FIG. 1 from a rear view.
Figure 3:
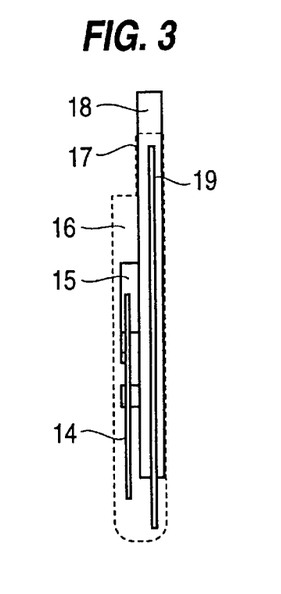
FIG. 3 is a structural diagram of a PCMCIA card type hard disk drive unit as inserted into a PCMCIA connector and as seen from a side.

FIG. 2 is a sectional rear view of the combined portable camera-video system of FIG. 1, and FIG. 3 illustrates sectional view of the PCMCIA card type hard disk drive shown in FIG. 1, such hard disk drive being mounted within a connector conforming to the PCMCIA standard. More particularly, in FIGS. 2 and 3, the numeral 14 denotes a hard disk of 1.8 inch size, and numeral 15 denotes a magnetic head thereof. Further, the numeral 19 denotes a circuit board on which there are mounted a circuit for controlling said hard disk, a recording/reproducing circuit, etc. These components are covered with a housing 16 formed for covering the hard disk portion and a housing 17 formed for a covering circuit board portion, as illustrated in FIG. 3. Therefore, a terminal portion 18 of the PCMCIA connector is formed as thin as about 5 mm in comparison with the hard disk portion which is 10.5 mm thick. According to the present invention, the thin terminal portion 18 of the PCMCIA and type hard disk drive can be positioned on the inner surface side of the system, and space neighboring the thin terminal portion 18 can be utilized effectively, for example, as the space for the lens rotating mechanism 12.

Figure 4:
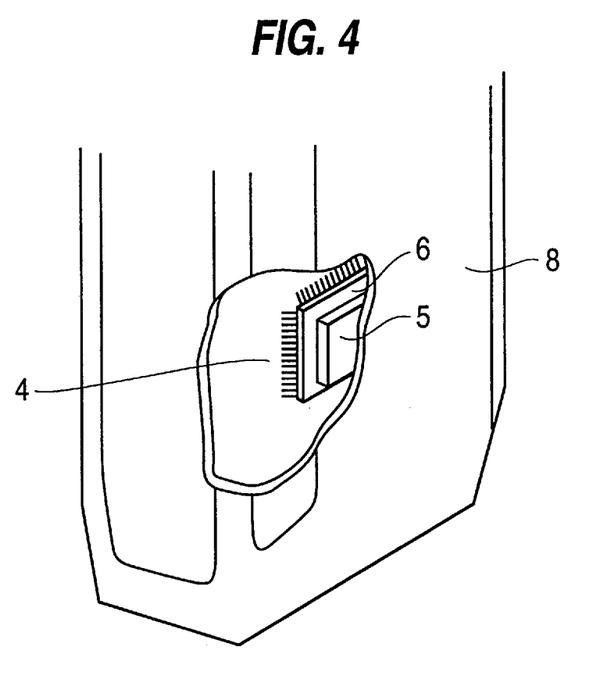
FIG. 4 is an enlarged view of heat radiator means according to the present invention.

FIG. 4 illustrates on a larger scale in a partial cutaway form, the heat radiating means for the encoder LSI package 6 which has been explained above in connection with FIG. 1. In FIG. 4, the same portions as in FIG. 1 are indicated by the same reference numerals. In explaining FIG. 4, heat of several hundred mW generated in the MPEG1 encoder LSI package 6 mounted on the circuit board 4 (also carrying a signal processing circuit thereon) is transmitted to the system housing 8 formed of aluminum or the like. Such heat transmission is effected through use of a material or medium 5 of a high thermal conductivity such as, for example, a rubbery material of a high thermal conductivity, a metallic material of a high thermal conductivity such as copper or aluminum, a thermally conductive paste or jell (e.g., jell pack), etc. Thus, heat can be dissipated using the housing 8 and the rise in internal temperature of the system can be kept low. In addition, a thermally conductive paste or jell (e.g., silicon paste) can be used within an interface space between the LSI package 6 and the plate 5 and/or interface between the plate 5 and housing 8, to further improve a thermal conduction therebetween and thus an amount of heat transfer to the housing.

The structure shown in FIG. 4 is characteristic in that the reduction of size and a great reduction of cost can be realized in comparison with a heat radiating plate (e.g., fined heat sink) used with conventional electronic devices. It is optional whether the heat conduction material 5 is to be provided (e.g., mounted) on the LSI side of the circuit board, or on the system housing side. In a preferred embodiment the heat conductive material 5 is a conductive rubber material glued to an inside of the housing 8, and has sufficient resiliency to apply pressure to a contacting LSI package 6 in order to guarantee and improve thermal conduction therebetween.

Figure 5:
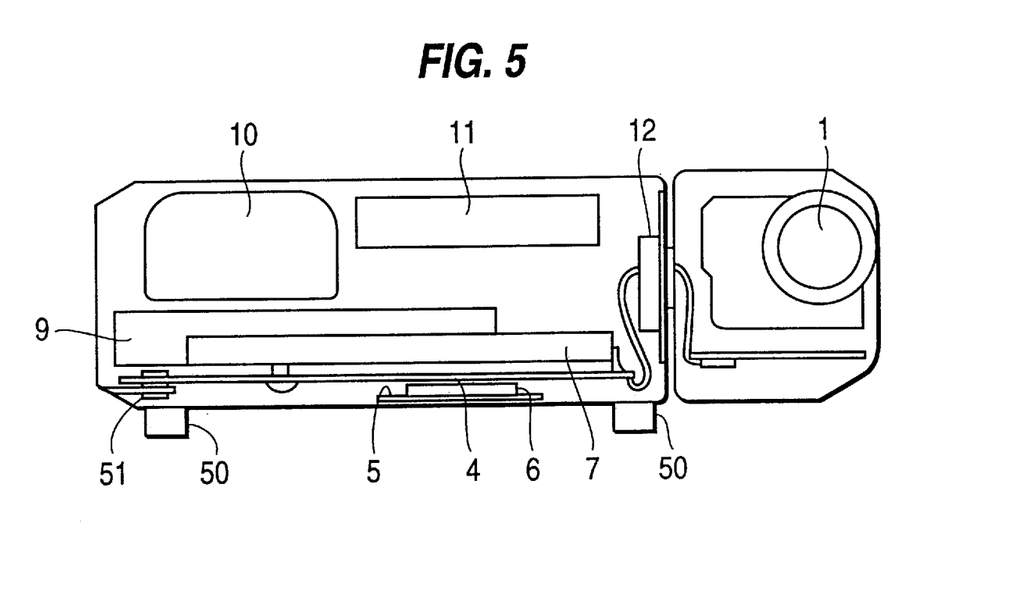
FIG. 5 is a structural diagram corresponding to FIG. 1 with the exception that the lens unit mounting direction has been modified.
Figure 6:
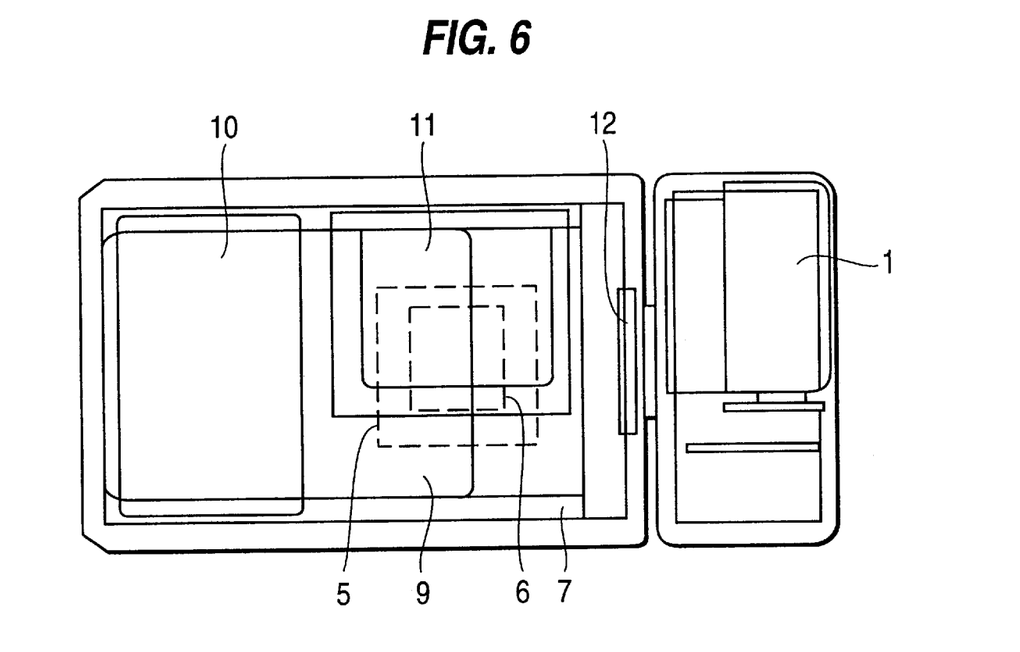
FIG. 6 is a top view of the structure shown in FIG. 5.

FIGS. 5 and 6 shows a modification of the system design according to the present invention, of which FIG. 6 is a view obtained by seeing FIG. 5 at a different angle. In both figures, the same components as in FIG. 1 are indicated by the same reference numerals. The illustrated arrangement is basically the same as in FIG. 1, but the entire system is arranged to be held horizontally while it is in use, i.e., the lens 1 having been provided on a different side of the system in comparison to the FIG. 1 embodiment. The liquid crystal panel 11 is disposed rotatedly at right angles as compared with that shown in FIG. 1, and the lens unit 1 is rotated toward an object at the time of photographing. By disposing the lens unit 1 in the transverse direction of the system as in FIG. 5, it is possible to decrease the projection from the system and hence possible to improve portability. The FIG. 5 system may further include legs 50 which allow such system 50 to be set on a horizontal surface (e.g., table). Such legs 50 have the advantages of providing non-sliding stability to the system and also allows air conduction to occur under the system, so as to allow air conduction dissipation of heat from the housing 8 to an external environment.

In FIG. 6, the liquid crystal panel may be removed, and instead, an optical finder may be attached to the panel-removed portion. A further reduction of size may be attained by adopting a fixed structure in place of the rotating mechanism 12.

According to the present invention, as set forth hereinabove, a plate or medium formed, e.g., of a thermally conductive rubber or copper higher in thermal conductivity than air, is mounted on the encoder LSI package attached to a side of the circuit board opposite to the hard disk mounted side, to conduct heat to the system housing formed of aluminum or other material high in thermal conductivity, whereby the following effects can be attained.

More particularly, the problem that the internal temperature of the system rises to exceed the operating temperature of the LSI package, and the problem that the components, e.g., hard disk, disposed within the system are affected by undissipated heat and raised temperature, are avoided. Accordingly, a marked increases in system reliability is obtained. In addition, any necessary increase in size of the system due to a conventional heat radiating plate (e.g., finned heat sink) usually employed for the conventional ICs or LSIs is avoided.

According to a further merit, since the hard disk can be disposed centrally in the interior of the system, even when an impact or vibration is exerted on the exterior of the system, such impact or vibration is transmitted through the mounting frame, so that the impact or vibration is relatively diminished, thus contributing also to the stability of the hard disk. There also is a merit that the rotating mechanism etc. can be mounted efficiently because the space formed by the connector and hard disk body of the PCMCIA Type 3 can be utilized effectively.

As an additional advantage, by drawing the LSI package surface and the system housing very close to each other, for example, not larger than 2 mm in terms of the spacing between the two, the heat of the LSI package can be transferred to the system housing at a high efficiency. Consequently, the closer the circuit board and especially the LSI package to the system housing, the lower can be kept the rise in internal temperature of the system. Thus, a combined portable camera-video system can be realized very efficiently without contradiction to the reduction in size of the system.

Accordingly, on a basis of the above disclosure, it should now be readily clear that by using a PCMCIA card type hard disk, etc., it is possible to attain a great reduction in size of the system of a compact video/still camera and ensure a high reliability thereof with little increase of cost. While the above preferred embodiments are described as advantageously providing thermal, vibration and impact protection to a PCMCIA hard disk drive, the arrangement of the present invention may likewise be applicable to providing such protection to other storage arrangements, e.g., a flash card memory.

While we have shown and described several embodiments in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

What is claimed is:

1. An image recording/reproducing system comprising:

an external housing for accommodating components of said image recording/reproducing system;

an optical lens for providing an image signal; and a semiconductor chip mounting a digital signal processing integrated circuit for compressing said image signal, a major planar surface of the semiconductor chip adjoins a predetermined opposing internal surface of the external housing in comparison to other surfaces of the semiconductor chip and other internal surfaces of the external housing, wherein the adjoining said major planar surface of said semiconductor chip is arranged for transferring heat generated thereby to outside of the external housing through said predetermined opposing internal surface of said external housing for heat dissipation thereof.

2. An image recording/reproducing system comprising:

a housing for accommodating components of said image recording/reproducing system;

an optical lens for providing an image signal; and a semiconductor chip mounting a digital signal processing integrated circuit for compressing said image signal, a major planar surface of the semiconductor chip adjoins a predetermined opposing internal surface of the external housing in comparison to other surfaces of the semiconductor chip and other internal surfaces of the external housing, wherein the adjoining said major planar surface of said semiconductor chip integrated circuit is arranged for transferring heat generated thereby to outside of the external housing through said predetermined opposing internal surface of said external housing for heat dissipation thereof, wherein said semiconductor chip more specifically includes a heat conduction medium which is associated with said major planar surface of the semiconductor chip and said predetermined opposing internal surface of said external housing for transferring heat from said semiconductor chip to said predetermined opposing internal surface of said external housing.

3. An image recording/reproducing system as claimed in claim 2, wherein said heat conduction medium is composed of at least one of a metal component, a heat conductive rubber, a heat conductive jell component and a heat conductive paste.

4. An image recording/reproducing system as claimed in claim 1, wherein said semiconductor chip is arranged within a predetermined distance from said predetermined opposing internal surface of said external housing provide a predetermined level of heat transfer from said semiconductor chip to said predetermined opposing internal surface of said external housing.

5. An image recording/reproducing system as claimed in claim 4, wherein said semiconductor chip circuit is more specifically arranged within 2 mm from said predetermined opposing internal surface of said external housing.

6. An image recording/reproducing system as claimed in claim 1, wherein said internal surface of said external housing for heat dissipation is composed of at least one of aluminum, copper, magnesium, silver and gold.

7. An image recording/reproducing system comprising:

a external housing for accommodating components of said image recording/reproducing system;

an optical lens for providing an image signal;

a semiconductor chip mounting a digital signal processing integrated circuit for compressing said image signal, a major planar surface of the semiconductor chip adjoins a predetermined opposing internal surface of the external housing in comparison to other surfaces of the semiconductor chip and other internal surfaces of the external housing, wherein the adjoining said major planar surface of said semiconductor chip integrated circuit is arranged for transferring heat generated thereby to outside of the external housing through said predetermined opposing internal surface of said external housing for heat dissipation thereof, a digital information recording apparatus positioned substantially within a central region of said external housing so as to minimize vibrations and impacts applied externally to said external housing from affecting said digital information recording apparatus, and so as to minimize transmission of digital information recording apparatus noise to an outside of said external housing.

8. An image recording/reproducing system as claimed in claim 7, wherein said digital information recording apparatus is more specifically a insertably removable hard disk drive conforming to one of a Type 2 and Type 3 PCMCIA (Personal Computer Memory Card International Association) standard.

9. An image recording/reproducing system, comprising:

an optical lens means for providing an image signal;

a digital signal processing integrated circuit arrangement for compressing said image signal, wherein said digital signal processing integrated circuit arrangement is arranged for transferring heat generated thereby to at least a portion of a housing of said image recording/reproducing system, for heat dissipation thereof;

a digital information recording apparatus positioned substantially within a central region of said housing so as to minimize vibrations and impacts applied externally to said housing from affecting said digital information recording apparatus, and so as to minimize transmission of digital information recording apparatus noise to an outside of said housing;

wherein said digital information recording apparatus is more specifically a insertably removable hard disk drive conforming to one of a Type 2 and Type 3 PCMCIA (Personal Computer Memory Card International Association) standard;

further comprising an vibration/impact isolation arrangement provided with respect to at least one of between said housing and a printed circuit board supporting said digital information recording apparatus thereon and between said printed circuit board and said digital information recording apparatus, said vibration/impact isolation arrangement being for diminishing or preventing said vibrations and impacts applied externally to said housing from affecting said digital information recording apparatus.

10. An image recording/reproducing system as claimed in claim 9, wherein said vibration/impact isolation arrangement is at least one of a spring, rubber or foam component providing mounting at at least one of between said housing and a printed circuit board supporting said digital information recording apparatus thereon and between said printed circuit board and said digital information recording apparatus.

11. An image recording/reproducing system as claimed in claim 9, wherein said printed circuit board has said semiconductor chip mounted on a chip mounting surface which opposes said internal surface of said housing, and further has said digital information recording apparatus mounted on a surface of said printed circuit board unit, which surface is different from said chip mounting surface such that said printed circuit board unit acts as thermal barrier for at least partially isolating said digital information recording apparatus from heat generated by said semiconductor chip.

12. An image recording/reproducing system as claimed in claim 1, wherein said image recording/reproducing system is more specifically one of a video camera, a still camera and a combined video/still camera.

13. An image recording/reproducing system comprising:

an external housing;

an optical lens means for providing an image signal;

a semiconductor chip mounting a digital signal processing integrated circuit for compressing said image signal, a major planar surface of the semiconductor chip adjoins a predetermined opposing internal surface of the external housing in comparison to other surfaces of the semiconductor chip and other internal surfaces of the external housing, a printed circuit board unit having said semiconductor chip mounted on a chip mounting surface which opposes a surface of said external housing, such that the adjoining said major planar surface of said semiconductor chip is arranged for transferring heat generated thereby to at least said predetermined opposing internal surface of said external housing, for heat dissipation thereof; and a digital information recording apparatus mounted on a surface of said printed circuit board unit, which surface is different from said chip mounting surface such that said printed circuit board unit acts as a thermal barrier for at least partially isolating said digital information recording apparatus from heat generated by said semiconductor chip.

14. An image recording reproducing system, comprising:

an external housing;

an optical lens means for providing an image signal;

a semiconductor chip mounting a digital signal processing integrated circuit for compressing said image signal, a major planar surface of the semiconductor chip adjoins a predetermined opposing internal surface of the external housing in comparison to other surfaces of the semiconductor chip and other internal surfaces of the external housing, a printed circuit board unit having said semiconductor chip mounted on a chip mounting surface which opposes a surface of said external housing, such that the adjoining said major planar surface of said semiconductor chip is arranged for transferring heat generated thereby to at least said predetermined opposing internal surface of said external housing, for heat dissipation thereof;

a digital information recording apparatus mounted on a surface of said printed circuit board unit, which surface is different from said chip mounting surface such that said printed circuit board unit acts as a thermal barrier for at least partially isolating said digital information recording apparatus from heat generated by said semiconductor chip;

a heat conduction medium which is associated with said major planar surface of said semiconductor chip and said predetermined opposing internal surface of said external housing, for transferring heat from said a semiconductor chip to said predetermined opposing internal surface of said external housing.

15. An image recording/reproducing system as claimed in claim 14, wherein said heat conduction medium is composed of at least one of a metal component, a heat conductive rubber, a heat conductive jell component and a heat conductive paste.

16. An image recording/reproducing system as claimed in claim 13, wherein said semiconductor chip is more specifically arranged within a predetermined distance from said predetermined opposing internal surface of said external housing to provide a predetermined level of heat transfer from said semiconductor chip to said predetermined opposing internal surface of said external housing.

17. An image recording/reproducing system as claimed in claim 16, wherein said semiconductor is more specifically arranged within 2 mm form said predetermined opposing internal surface of said external housing.

18. An image recording/reproducing system as claimed in claim 13, wherein said internal of said external housing for heat dissipation is composed of at least one of aluminum, copper, magnesium, silver and gold.

19. An image recording/reproducing system, an external housing;

an optical lens means for providing an image signal;

a semiconductor chip mounting a digital signal processing integrated circuit for compressing said image signal, a major planar surface of the semiconductor chip adjoins a predetermined opposing internal surface of the external housing in comparison to other surfaces of the semiconductor chip and other internal surfaces of the external housing, a printed circuit board unit having said semiconductor chip mounted on a chip mounting surface which opposes a surface of said external housing, such that the adjoining said major planar surface of said semiconductor chip is arranged for transferring heat generated thereby to at least said predetermined opposing internal surface of said external housing, for heat dissipation thereof; and a digital information recording apparatus mounted on a surface of said printed circuit board unit, which surface is different from said chip mounting surface such that said printed circuit board unit acts as a thermal barrier for at least partially isolating said digital information recording apparatus from heat generated by said semiconductor chip;

wherein said digital information recording apparatus is positioned substantially within a central region of said external housing so as to minimize vibrations and impacts applied externally to said external housing from affecting said digital information recording apparatus, and so as to minimize transmission of digital information recording apparatus noise to an outside of said external housing.

20. An image recording/reproducing system as claimed in claim 19, wherein said digital information recording apparatus is more specifically a insertably removable hard disk drive conforming to one of a Type 2 and Type 3 PCMCIA (Personal Computer Memory Card International Association) standard.

21. An image recording/reproducing system, comprising:
a housing;

an optical lens means for providing an image signal;

a semiconductor chip mounting a digital signal processing integrated circuit for compressing said image signal, a surface of the semiconductor chip is provided opposite closely to an internal surface of the housing;

a printed circuit board unit having said semiconductor chip mounted on a chip mounting surface which opposes a surface of said housing, such that said semiconductor chip is arranged for transferring heat generated thereby to at least said internal surface of said housing, for heat dissipation thereof;

a digital information recording apparatus mounted on a surface of said printed circuit board unit, which surface is different from said chip mounting surface such that said printed circuit board unit acts as a thermal barrier for at least partially isolating said digital information recording apparatus from heat generated by said semiconductor chip; and an vibration/impact isolation arrangement provided with respect to at least one of between said housing and said printed circuit board unit and between said printed circuit board unit and said digital information recording apparatus, said vibration/impact isolation arrangement being for diminishing or preventing vibrations and impacts applied externally to said housing from affecting said digital information recording apparatus.

22. An image recording/reproducing system as claimed in claim 21, wherein said vibration/impact isolation arrangement is at least one of a spring, rubber or foam component providing mounting at at least one of between said housing and a printed circuit board unit and between said printed circuit board unit and said digital information recording apparatus.

23. An image recording/reproducing system as claimed in claim 13, wherein said image recording/reproducing system is more specifically one of a video camera, a still camera and a combined video/still camera.

24. An image recording/reproducing system comprising:
an external housing for accommodating components of said image recording/reproducing system;

an optical lens for providing an image signal; and a semiconductor chip mounting a digital signal processing integrated circuit for compressing said image signal, a major planar chip surface of the semiconductor clip adjoins a predetermined opposing internal surface of the external housing in comparison to other surfaces of the semiconductor chip and other internal surfaces of the external housing, to minimize a heat transfer path between said chip surface and said predetermined opposing internal surface of said external housing so as to maximize heat transfer to said predetermined opposing internal surface while minimizing heat transfer to internal areas within said external housing.

25. An image recording/reproducing system comprising:

an external housing for accommodating components of said image recording/reproducing system;

an optical lens for providing an image signal; and a semiconductor chip mounting a digital signal processing integrated circuit for compressing said image signal, a major planar chip surface of the semiconductor chip adjoins a predetermined opposing internal surface of the external housing to minimize a sandwiched internal area within said external housing as sandwiched between said chip surface and said predetermined opposing internal surface of said external housing, so as to maximize heat transfer through said sandwiched internal area to said predetermined opposing internal surface of said external housing while minimizing heat transfer to non-sandwiched internal areas within said external housing.

* * * * *